July 12, 1960
G. O. ENGLEHARDT ET AL
2,944,835
BOAT TRAILER
Filed May 2, 1958
3 Sheets-Sheet 1
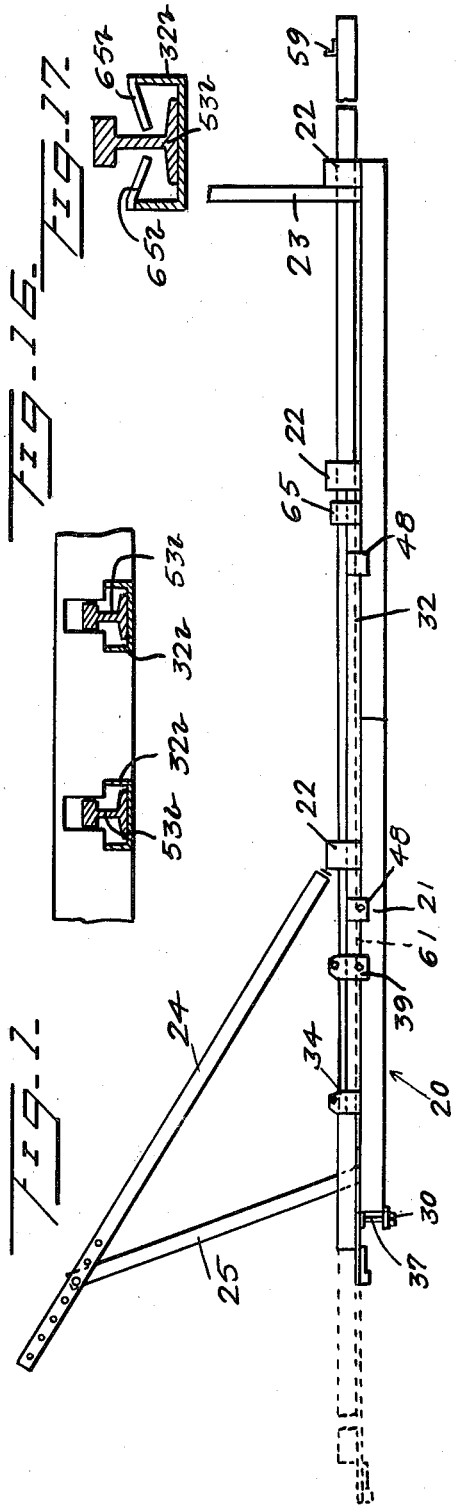
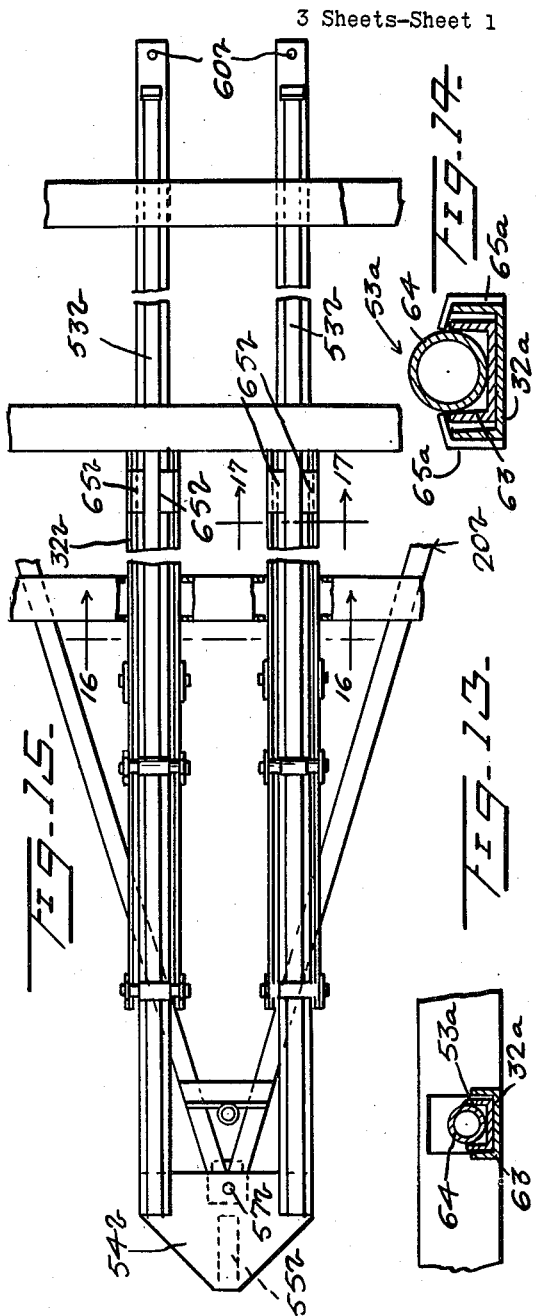
INVENTORS
Gustave O. Englehardt
Raymond E. Beaulac
BY Kimmel & Crowell
ATTORNEYS

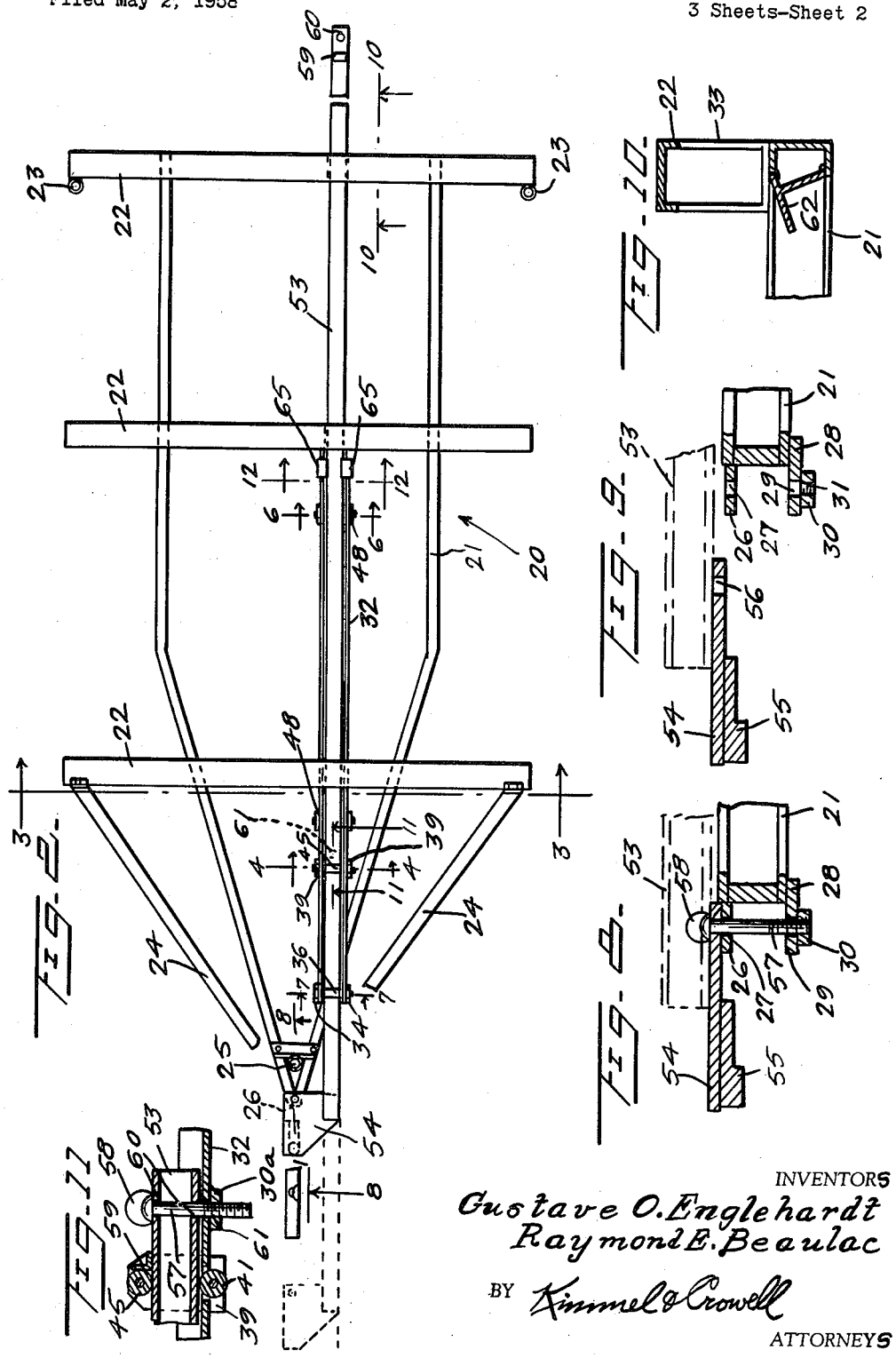

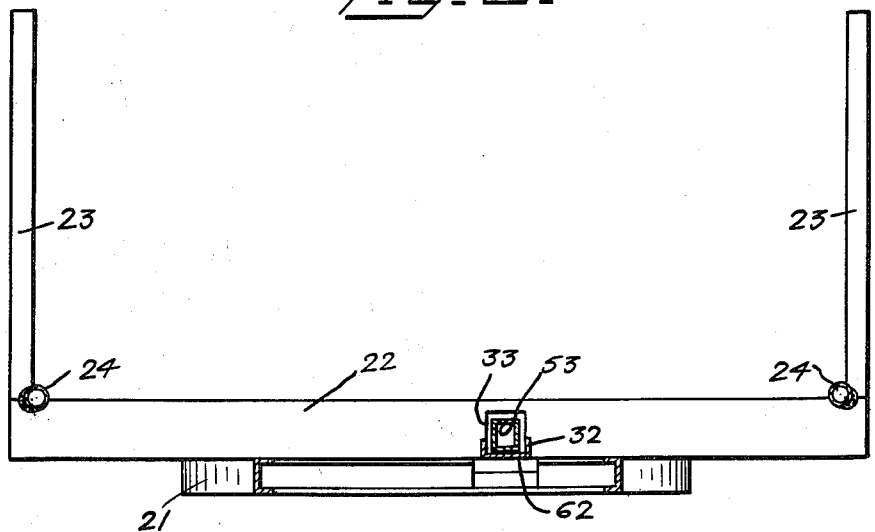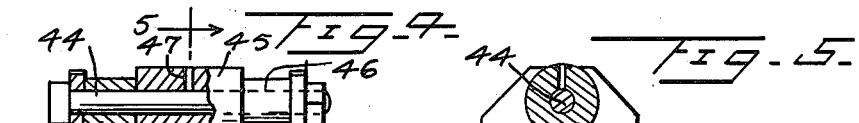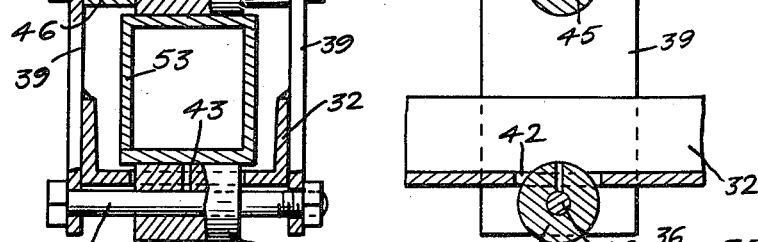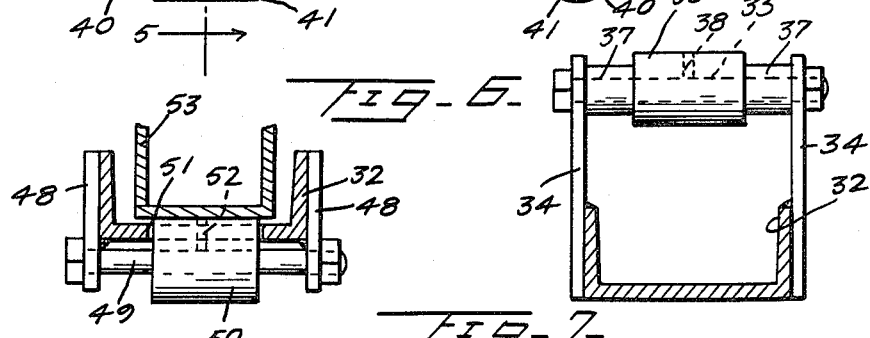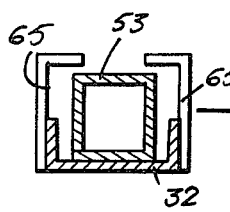

United States Patent Office 2,944,835
Patented July 12, 1960

2,944,835

BOAT TRAILER

Gustave O. Englehardt, 36 Central St., Turners Falls, Mass., and Raymond E. Beaulac, 157 School St., Greenfield, Mass.

Filed May 2, 1958, Ser. No. 732,660

1 Claim. (Cl. 280—482)

The present invention relates to boat trailers, and particularly to boat trailers having means to assist in the launching and loading of boats thereon.

The primary object of the invention is to provide a boat trailer having an extensible tongue to permit the trailer to be backed into the water for launching and loading a boat with the tractor vehicle remaining on dry land.

Another object of the invention is to provide a boat trailer of the class described above in which the tongue is mounted on antifriction means to facilitate the extension and retraction thereof with respect to the trailer body.

A further object of the invention is to provide a boat trailer of the class described above in which an extensible tongue is releasably locked in retracted position and in extended position.

A still further object of the invention is to provide a boat trailer of the class described above which is inexpensive to manufacture, simple to use, and in which the trailer weight is not materially increased over that of a conventional trailer.

Other objects and advantages will become apparent in the following specification when considered in the light of the attached drawings, in which:

Figure 1 is a side elevation of the invention shown partially broken away for convenience of illustration.

Figure 2 is a top plan view of the invention shown partially broken away and in section for convenience of illustration.

Figure 3 is an enlarged transverse cross-section taken along the line 3—3 of Figure 2, looking in the direction of the arrows.

Figure 4 is an enlarged fragmentary transverse cross-section taken along the line 4—4 of Figure 2, looking in the direction of the arrows.

Figure 5 is a fragmentary longitudinal cross-section taken along the line 5—5 of Figure 4, looking in the direction of the arrows.

Figure 6 is an enlarged fragmentary transverse cross-section taken along the line 6—6 of Figure 2, looking in the direction of the arrows.

Figure 7 is an enlarged fragmentary transverse cross-section taken along the line 7—7 of Figure 2, looking in the direction of the arrows.

Figure 8 is an enlarged fragmentary longitudinal cross-section taken along the line 8—8 of Figure 2, looking in the direction of the arrows.

Figure 9 is a view similar to Figure 8, illustrating the extensible tongue in adjusted position.

Figure 10 is an enlarged fragmentary longitudinal cross-section taken along the line 10—10 of Figure 2, looking in the direction of the arrows.

Figure 11 is an enlarged fragmentary longitudinal section taken along the line 11—11 of Figure 2, looking in the direction of the arrows, with the extensible tongue illustrated in extended position.

Figure 12 is an enlarged fragmentary transverse cross-section taken along the line 12—12 of Figure 2, looking in the direction of the arrows.

Figure 13 is a fragmentary transverse cross-section illustrating a modified form of the invention.

Figure 14 is a fragmentary transverse cross-section illustrating another portion of the modified form of the invention illustrated in Figure 13.

Figure 15 is a fragmentary top plan view of another modified form of the invention shown partially broken away for convenience of illustration.

Figure 16 is a fragmentary transverse cross-section taken along the line 16—16 of Figure 15, looking in the direction of the arrows.

Figure 17 is an enlarged fragmentary transverse cross-section taken along the line 17—17 of Figure 15, looking in the direction of the arrows.

Referring now to the drawings in detail wherein like reference characters indicate like parts throughout the several figures, the reference numeral 20 indicates generally a boat trailer constructed in accordance with the invention.

The boat trailer 20 includes a conventional frame 21 supported on wheels (not shown) in a conventional manner. The frame 21 is provided with a plurality of transversely extending bolsters 22 arranged in spaced parallel relation to support a boat. The rearmost bolster 22 has uprights 23 secured to the oposite ends thereof and the foremost bolster 22 is provided at its opposite ends with forwardly and inwardly upwardly sloping arms 24 adjustably supported at their forward ends by a post 25. The post 25 is fixed at its lower end to the forward end of the frame 21.

As best shown in Figures 2 and 9, the frame 21 is provided with an ear 26 at the forward end thereof extending horizontally from the upper edge of the frame 21. The ear 26 has a vertical bore 27 extending downwardly therethrough. A second ear 28 is secured to the lower edge of the frame 21 in spaced apart parallel relation to the ear 26 and is provided with a vertical bore 29 arranged in axially aligned relation with the bore 27. A nut 30 is welded to the underside of the ear 28 with its threaded bore 31 arranged in axially aligned relation with the bores 27, 29.

An elongated channel iron track 32 extends longitudinally of the trailer 20 in engagement with the upper face of the frame 21 and extending through a guide opening 33 formed in the foremost bolster 22. The channel track 32 is secured to the frame 21, the foremost bolster 22, and the intermediate bolster 22 by welding.

The channel track 32 is offset from the center of the frame 21 and extends in spaced parallel relation to the longitudinal center line of the frame 21. The channel track 32 adjacent the forward end thereof is provided with a pair of upstanding oppositely disposed plates 34 welded to opposite sides of the channel track 32. A shaft 35 is supported in the upper ends of the plates 34 in parallel relation to the channel track 32.

A roller 36 is journalled on the shaft 35 and maintained in central position thereon by sleeves 37 supported on the shaft 35 on each side of the roller 36. The roller 36 has an oil hole 38 extending therethrough to provide means for oiling the contacting surfaces between the roller 36 and the shaft 35.

The channel track 32, at a point spaced rearwardly from the plates 34, is provided with a pair of plates 39 arranged in upright parallel relation and welded to opposite sides of the channel track 32. The plates 39 are somewhat longer than the plates 34 extending below the channel track 32 as well as to a point thereabove.

A shaft 40 is supported in parallel relation to the channel track 32 by the lower ends of the plates 39 and has a roller 41 journalled centrally thereon, as best shown in Figure 4. The channel track 32 has an opening 42 formed in the base thereof through which the roller 41 extends to a point slightly above the upper surface of the base of the channel track 32. The roller 41 has an oil hole 43 formed therein to lubricate the contacting surfaces of the roller 41 and the shaft 40.

A shaft 44 is supported in the upper ends of the plates 39 parallel to the shaft 40 and has a roller 45 journalled thereon and maintained in its central position by spaced collars 46 engaged on opposite sides thereof. The roller 45 is provided with an oil hole 47 extending therethrough to lubricate the contacting surfaces of the roller 45 and the shaft 44. The roller 45 is spaced above the channel track 32 the same amount as the roller 36.

At a point closely adjacent the plates 39, and at a second point adjacent to the rear end of the channel track 32, upright plates 48 are welded to opposite sides of the channel track 32 with portions thereof depending therebelow. A shaft 49 is supported in the lower ends of the plates 48 parallel to the channel track 32 and has a roller 50 journalled thereon intermediate the opposite sides thereof.

The channel track 32 is provided with an opening 51 in the base thereof through which the roller 50 projects extending to a point slightly above the upper surface of the base of the channel track 32. The roller 50 is provided with an oil hole 52 by means of which the surfaces between the roller 50 and the shaft 49 are lubricated. The roller 50 extends to the same height above the channel track 32 as the roller 41.

An elongated tongue 53 of generally rectangular cross-section is positioned within the channel track 32 and supported by the rollers 41, 50 with the rollers 36, 45 engaging the upper surface thereof. A plate 54 is secured to the underside of the forward end of the tongue 53 and extends laterally therefrom to a point beyond the center of the frame 21.

The plate 54 has a conventional trailer hitch 55 mounted thereon and centered on the center line of the frame 21. A bore 56 extends vertically through the rear portion of the plate 54 in aligned relation with the bores 27, 29 in the ears 26, 28, respectively, and a threaded coupling pin 57 extends through the bores 56, 27, 29, and is threaded into the nut 30.

The coupling pin 57 is provided with an enlarged head 58 to permit the coupling pin 57 to be removed and replaced by hand.

An angle iron stop 59 is secured to the upper face of the rear end of the tongue 53 in position to engage the roller 45 at the forward end of the movement of the tongue 53 to align a bore 60 in the rear end of the tongue 53 with a bore 61 formed in the base of the channel track 32 adjacent to and rearwardly of the roller 45.

The coupling pin 57 engages through the bore 60 in the tongue 53, through the bore 61 in the channel track 32, and is threaded through a nut 30a welded to the channel track 32 securing the tongue 53 in its outermost position.

An upwardly and rearwardly sloping ramp 62 is welded to the frame 21 underlying the rear bolster 22 and arranged in a line with the tongue 53. The ramp 62 engages the rear end of the tongue 53 camming it upwardly to engage over the frame 21 when the tongue 53 is being slid rearwardly to its innermost position.

The channel track 32 adjacent the rear end thereof is provided with a pair of inverted L-shaped guide members 65 secured to opposite sides thereof and extending inwardly to overlie the tongue 53, as best shown in Figure 12, to prevent the tongue 53 from moving upwardly out of the channel track 32.

In the use and operation of the invention illustrated in Figures 1 through 11, the trailer 20 is towed behind a motor vehicle with a boat in place thereon. On reaching the water's edge, the coupling pin 57 is detached and the trailer wheels are secured in position by wheel chocks to permit the motor vehicle to move forwardly pulling the tongue 53 to its foremost position with the stop 59 in engagement with the roller 45. With the tongue 53 in this position, the coupling pin 57 is dropped through the bores 60, 61 to lock the tongue 53 in its extended position with respect to the channel track 32.

The trailer 20 with its extended tongue 53 is then backed into the water a sufficient distance to float the boat thereon while the motor vehicle remains on dry land. The trailer is then towed from the water and the tongue 53 is moved to its innermost position by a reversal of the above steps, and the trailer 20 is again ready for movement over the road.

In Figure 12, a modified form of the invention is illustrated wherein a tongue 53a includes a channel member 63 having a pipe 64 welded therein to provide a reinforced tongue structure.

A pair of substantially L-shaped guide members 65a are secured to opposite sides of the channel track 32a extending inwardly to overlie the channel member 63 securing the tongue 53a to the channel track 32a against accidental displacement.

In the modification illustrated in Figures 13, 14, a heavy-duty boat trailer 20b is illustrated. The boat trailer 20b is provided with a pair of spaced apart channel tracks 32b arranged in spaced apart relation parallel to and on opposite sides of the longitudinal center line of the trailer 20b. The channel tracks 32b are mounted in the same manner as the channel track 32 in the preferred form of the invention.

A tongue 53b having a rail shaped cross-section is mounted for longitudinal sliding movement in each of the channel tracks 32b. A flat plate 54b extends transversely of and is connected to the under sides of the forward ends of the tongues 53b. A trailer hitch 55b is mounted beneath the plate 54b and a coupling pin 57b detachably couples the plate 54b to the forward end of the trailer 20b.

The rear ends of the tongues 53b are provided with bores 60b by means of which the tongues 53b are secured to the channel tracks 32b at their foremost position in the same manner as the tongue 53 is secured to the channel track 32.

The channel tracks 32b adjacent the rear ends thereof are provided with a pair of inwardly extending guide plates 65b which overlie the lower flange of the rails 53b, as best seen in Figure 17, to prevent the rail 53b from raising out of the channel track 32b with the tongue 53b in its furthermost position of extension.

With the apparatus illustrated in Figures 13, 14, a substantially heavier boat can be manipulated on the trailer 20b than is possible on the trailer 20.

It should be understood that the tongues 53 and 53a may both be used as double tongues in the same manner as the tongue 53b and that the tongue 53b may be used as a single tongue in the same manner as the tongue 53 when desired.

Having thus described the preferred embodiments of the invention, it should be understood that numerous structural modifications and adaptations may be resorted to without departing from the scope of the appended claim.

What is claimed is:

A boat trailer comprising a frame, a longitudinally extending upwardly opening channel track arranged in offset parallel relation to the longitudinal center line of said frame, said channel track having a horizontal bight portion and a pair of oppositely disposed upstanding parallel legs, an extensible tongue supported in said channel track for longitudinal sliding movement, a plurality of antifriction rollers mounted on said channel track projecting through and slightly above said horizontal bight portion supporting said tongue in spaced relation thereabove, additional antifriction rollers mounted on said channel track in upwardly spaced relation to said bight portion engaging over said tongue securing said tongue in said channel track, an offset plate secured to the forward end of said tongue with said plate offset to extend beyond the center line of said frame, pin means releasably securing said plate to the forward end of said frame, and a trailer hitch mounted on said plate and centered on the center line of said frame for securing said trailer to a towed vehicle, said frame being provided with a pair of channel tracks arranged in equi-spaced oppositely disposed relation to the longitudinal center line of said trailer, and said tongue including an elongated member arranged for longitudinal sliding movement in each of said channel tracks with said plate connecting the forward end of said tongues.

References Cited in the file of this patent

UNITED STATES PATENTS

| | | |
|---|---|---|
| 2,382,299 | Deiters | Aug. 14, 1945 |
| 2,720,413 | Halverson | Oct. 11, 1955 |
| 2,787,383 | Antos et al. | Apr. 2, 1957 |
| 2,797,008 | Banker | June 25, 1957 |
| 2,810,589 | Tarleton | Oct. 22, 1957 |